United States Patent
Kang et al.

(10) Patent No.: US 12,127,319 B2
(45) Date of Patent: Oct. 22, 2024

(54) METHOD OF RESETTING LIGHTING DEVICE CONTROL APPARATUS BY USING WALL SWITCH

(71) Applicant: K-Bell Co., LTD., Daejeon (KR)

(72) Inventors: Kyeong Hoon Kang, Daejeon (KR); Young Jin Lim, Daejeon (KR); Young Sik Jang, Sejong-si (KR)

(73) Assignee: K-Bell Co., LTD., Daejeon (KR)

( * ) Notice: Subject to any disclaimer, the term of this patent is extended or adjusted under 35 U.S.C. 154(b) by 250 days.

(21) Appl. No.: 17/985,080

(22) Filed: Nov. 10, 2022

(65) Prior Publication Data
US 2024/0164001 A1    May 16, 2024

(30) Foreign Application Priority Data
Oct. 14, 2022  (KR) .......................... 10-2022-0132450

(51) Int. Cl.
*H05B 47/19*    (2020.01)
*G08C 17/02*    (2006.01)

(52) U.S. Cl.
CPC ............. *H05B 47/19* (2020.01); *G08C 17/02* (2013.01)

(58) Field of Classification Search
None
See application file for complete search history.

(56) References Cited

U.S. PATENT DOCUMENTS

2015/0048760 A1* 2/2015 Kwag ................. H05B 47/115
                                                               315/307
2019/0380191 A1* 12/2019 Wu ..................... H05B 39/044

* cited by examiner

*Primary Examiner* — Anh Q Tran

(57) ABSTRACT

The present invention relates to a method of resetting a lighting device control apparatus by using a wall switch, capable of resetting an AP setting of the lighting device control apparatus more conveniently in a smart residential lighting device network system including: a plurality of lighting devices provided in an indoor space; a plurality of lighting device control apparatuses for individually or collectively controlling the lighting devices; a plurality of APs configured to perform WiFi communication with the lighting device control apparatuses, respectively; a user terminal for remotely controlling the lighting devices; a lighting device server configured to transmit a lighting device control signal generated by the user terminal to a lighting device control apparatus of a lighting device corresponding to the lighting device control signal; and a home gateway configured to perform relay between the APs and the lighting device server.

7 Claims, 11 Drawing Sheets

FIG. 6

| AP<br>PERIOD | AP #1<br>(2000.1) | AP #2<br>(2000.2) | ... | AP #6<br>(2000.6) |
|---|---|---|---|---|
| T1 | 9 | 1 | | 5 |
| T2 | 8 | 3 | | 7 |
| T3 | 9 | 2 | | 8 |
| ⋮ | ⋮ | ⋮ | | ⋮ |
| TOTAL | 89 | 39 | | 63 |
| | ⇩<br>RELAY<br>AP #1 | ⇩<br>RELAY-<br>REQUIRED<br>AP #1 | | ⇩<br>RELAY<br>AP #4 |

METHOD OF RESETTING LIGHTING DEVICE CONTROL APPARATUS BY USING WALL SWITCH

BACKGROUND OF THE INVENTION

1. Field of the Invention

The present invention relates to a method of resetting a lighting device control apparatus by using a wall switch, and more particularly, to a method of resetting a lighting device control apparatus by using a wall switch, capable of resetting an AP setting of the lighting device control apparatus more conveniently in a smart residential lighting device network system including: a plurality of lighting devices provided in an indoor space; a plurality of lighting device control apparatuses for individually or collectively controlling the lighting devices; a plurality of APs configured to perform WiFi communication with the lighting device control apparatuses, respectively; a user terminal for remotely controlling the lighting devices; a lighting device server configured to transmit a lighting device control signal generated by the user terminal to a lighting device control apparatus of a lighting device corresponding to the lighting device control signal; and a home gateway configured to perform relay between the APs and the lighting device server.

2. Description of the Related Art

The Internet of Things (IoT) refers to technology in which all things (devices) are connected to each other through the Internet to communicate directly with each other, and data collected or derived by one thing is transmitted to another thing through the communication between the things. Furthermore, since the Internet of Things may create various added values by allowing convergence of a specific service with other services or convergence of a specific industry with other industries, the Internet of Things has been spotlighted as next-generation technology and infrastructure.

As the related art for remotely controlling a plurality of lighting devices provided in a residential space through a user terminal by using the Internet of Things technology described above, there is technology such as Korean Unexamined Patent Publication No. 10-2011-0055807 in which a dimming signal is generated to change an illuminance of a lighting device according to an input from an outside, and the dimming signal is provided to the lighting device through a wireless network, so that an output desired by a user or a uniform dimming output may be output from the lighting device.

As described above, the home IoT technology according to the related art essentially requires a wireless access point (AP) device configured to perform wireless communication with each thing. Meanwhile, there may be a case where resetting of a service set identifier (SSID) and a password of a wireless AP is required for reasons such as a change of an Internet service provider or a change of the password to strengthen security of the wireless AP. In this case, the user has to directly operate a lighting device control apparatus, such as an operation of pressing a physical button provided in the lighting device control apparatus, to perform a resetting operation of an AP corresponding to the lighting device control apparatus. However, since the lighting device control apparatus is generally installed on a ceiling of a space corresponding to the lighting device control apparatus, it may not be easy for the user to directly perform the AP resetting operation. Therefore, in order to anticipate an increase in the spread of smart lighting devices, there is a demand for a method of resetting a wireless AP with improved convenience.

DOCUMENTS OF RELATED ART

Patent Documents (Patent Document 0001) Korean Unexamined Patent Publication No. 10-2011-0055807 (May 26, 2011)

SUMMARY OF THE INVENTION

The present invention relates to a method of resetting a lighting device control apparatus by using a wall switch, and more particularly, an object of the present invention is to provide a method of resetting a lighting device control apparatus by using a wall switch, capable of resetting an AP setting of the lighting device control apparatus more conveniently in a smart residential lighting device network system including: a plurality of lighting devices provided in an indoor space; a plurality of lighting device control apparatuses for individually or collectively controlling the lighting devices; a plurality of APs configured to perform WiFi communication with the lighting device control apparatuses, respectively; a user terminal for remotely controlling the lighting devices; a lighting device server configured to transmit a lighting device control signal generated by the user terminal to a lighting device control apparatus of a lighting device corresponding to the lighting device control signal; and a home gateway configured to perform relay between the APs and the lighting device server.

To achieve the object described above, according to one embodiment of the present invention, there is provided a method of resetting a lighting device control apparatus by using a wall switch, the method including: an input signal transmission step of transmitting, by the wall switch, when a user operates the wall switch connected to a lighting device, an input signal according to the operation to the lighting device control apparatus configured to adjust a brightness and a color temperature of the lighting device; a reception number determination step of determining, by the lighting device control apparatus, whether the input signal transmitted from the wall switch has been received by a preset number of times or more within a preset time; a resetting information reception step of entering, by the lighting device control apparatus, when the input signal has been received by the preset number of times or more within the preset time, a resetting mode to enable a BLE stack for performing BLE communication with a user terminal for a predetermined time and perform the BLE communication with the user terminal for the predetermined time so as to receive resetting information including a service set identifier (SSID) and a password of a new access point (AP); and an AP connection step of initializing, by the lighting device control apparatus, AP setting information that is previously stored, performing AP resetting based on the received resetting information, accessing a WiFi communication network to search for an AP corresponding to the SSID and the password, and performing data communication with the AP, wherein, after the AP connection step, the lighting device control apparatus terminates the resetting mode, the user terminal transmits a lighting device control signal for controlling a lighting device corresponding to the lighting device control signal to a lighting device server, and the lighting device server transmits the lighting device control signal to the lighting device control apparatus through the new AP to control the brightness and the color temperature of the lighting device.

According to one embodiment of the present invention, anyone can safely and conveniently reset an AP setting of a lighting device control apparatus as compared with the related art in which there is a difficulty in resetting a lighting device control apparatus because the lighting device control apparatus is generally installed on a ceiling.

BRIEF DESCRIPTION OF THE DRAWINGS

FIG. 6 schematically shows a process of performing the AP classification step according to one embodiment of the present invention.

DETAILED DESCRIPTION OF THE INVENTION

Figure 1:
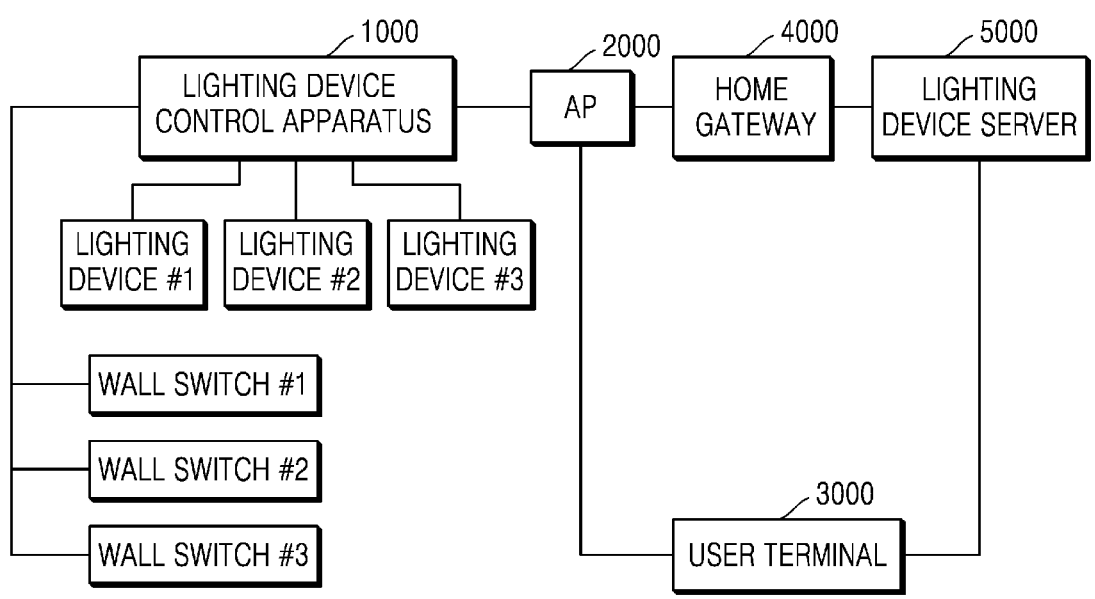
FIG. 1 schematically shows a configuration of a smart residential lighting device network system in which a method of resetting a lighting device control apparatus according to one embodiment of the present invention is performed.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect (s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components, or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

A "user terminal 3000" that will be described below may be implemented as a computer or a portable terminal capable of accessing a server or another terminal through a network. In this case, the computer may include, for example, a notebook computer, a desktop computer, and a laptop computer, which are equipped with a web browser. In addition, the portable terminal may be, for example, a wireless communication device in which portability and mobility are ensured, and may include all kinds of handheld-based wireless communication devices such as personal communication system (PCS), global system for mobile communications (GSM), personal digital cellular (PDC), personal handy-phone system (PHS), personal digital assistant (PDA), international mobile telecommunication (IMT)-2000, code-division multiple access (CDMA)-2000, wideband code-division multiple access (W-CDMA), and wireless broadband Internet (WiBro) devices.

FIG. 1 schematically shows a configuration of a smart residential lighting device network system in which a method of resetting a lighting device control apparatus 1000 according to one embodiment of the present invention is performed.

Schematically, as shown in FIG. 1, a method of resetting a lighting device control apparatus 1000 according to the present invention may be performed in a smart residential lighting device network system including a lighting device control apparatus 1000, an access point device 2000 (hereafter referred to as "AP"), a user terminal 3000, a home gateway 4000, and a lighting device server 5000.

In detail, the smart residential lighting device network system may correspond to a network system for controlling a plurality of smart lighting devices provided in an indoor space, preferably, a residential space by using the user terminal 3000. In more detail, as shown in FIG. 1, the smart residential lighting device network system may include: a plurality of smart lighting devices; a lighting device control apparatus 1000 for individually or collectively controlling the smart lighting devices; an AP 2000 for performing wireless communication with the lighting device control apparatus 1000; a user terminal 3000 for remotely controlling the smart lighting devices; a lighting device server 5000 configured to transmit a lighting device control signal generated by the user terminal 3000 to a lighting device control apparatus 1000 of a lighting device corresponding to the lighting device control signal; and a home gateway 4000 configured to perform relay between the AP 2000 and the lighting device server 5000.

Meanwhile, although only one lighting device control apparatus 1000 and one AP 2000 have been shown in FIG. 1, FIG. 1 shows one embodiment of the smart residential lighting device network system for convenience of understanding, so that a smart residential lighting device network system according to another embodiment of the present invention may include a plurality of lighting device control apparatuses 1000 and a plurality of APs 2000. The another embodiment will be described in more detail below with reference to FIGS. 4 to 10.

As shown in FIG. 1, the lighting device control apparatus 1000 may be configured such that one or more lighting devices are connected to one or more wall switches for controlling the one or more lighting devices, respectively. In other words, a wall switch #1 may control an on (turning on)/off (turning off)-state of a lighting device #1, and a wall switch #2 may control an on/off-state of a lighting device #2. The wall switch may correspond to a switch constantly connected to a power source to turn on and off a lighting device corresponding to the switch. The one or more lighting devices and the one or more wall switches may be connected to each other through the lighting device control apparatus 1000, respectively, and the lighting device control apparatus 1000 may control each of the one or more lighting devices through the lighting device control signal received from the AP 2000 connected to the lighting device control apparatus 1000 as well as the wall switch. In general, the lighting device control apparatus 1000 may be preferably installed on a ceiling of a space corresponding to the lighting device control apparatus 1000 for reasons of optimization of a communication environment or for aesthetic reasons.

Preferably, the lighting device control apparatus 1000 and the AP 2000 may be wirelessly connected to each other to perform wireless communication with each other, and more preferably, the lighting device control apparatus 1000 and the AP 2000 may perform the wireless communication by using WiFi communication. The AP 2000 may be connected to the home gateway 4000 in a wired or wireless manner to exchange data with the lighting device server 5000.

The lighting device server 5000 may directly or indirectly perform data communication with the user terminal 3000 to receive the lighting device control signal for controlling the lighting device, and may transmit the lighting device control signal to the lighting device control apparatus 1000 corresponding to the lighting device control signal through the home gateway 4000 and the AP 2000 so as to provide a plurality of lighting services to a user. Meanwhile, the user terminal 3000 may access the lighting device server 5000 or receive the service provided by the lighting device server 5000 through a dedicated application (hereinafter referred to as "app") installed in the user terminal 3000.

The user terminal 3000 may directly or indirectly perform the data communication with the lighting device server 5000 as described above, and may directly perform data communication with the lighting device control apparatus 1000. Preferably, the user terminal 3000 and the lighting device control apparatus 1000 may directly perform the data communication through a BLE communication network.

Figure 2:
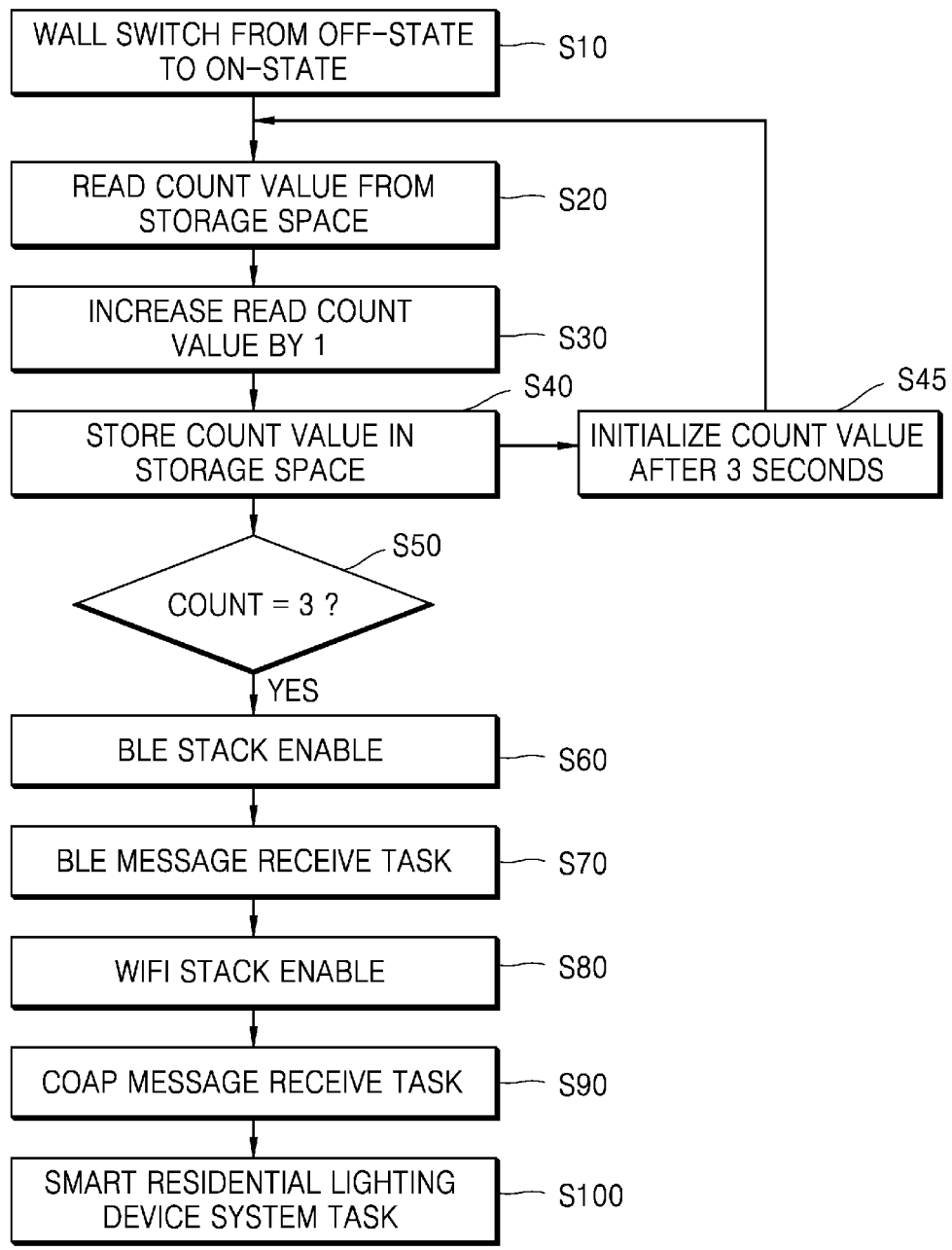
FIG. 2 schematically shows steps performed in a method of resetting a lighting device control apparatus according to one embodiment of the present invention.

FIG. 2 schematically shows steps performed in a method of resetting a lighting device control apparatus 1000 according to one embodiment of the present invention.

In detail, referring to FIG. 1, an input signal transmission step S10 of transmitting, by the wall switch, when a user operates a wall switch from an off-state to an on-state, an input signal to a lighting device control apparatus 1000 connected to a lighting device corresponding to the wall switch may be performed.

The lighting device control apparatus 1000 that has received the input signal may read a count value from a storage space provided in the lighting device control apparatus 1000 (S20). An initial value of the count value may be set to 0. When the lighting device control apparatus 1000 receives the input signal transmitted from the wall switch, 1 may be added to the count value read in the step S20 (S30), and the count value that has been increased may be stored in the storage space (S40). When the user repeatedly performs the step S10, the lighting device control apparatus 1000 may also repeatedly perform a process of the steps S20 to S40. The count value stored in the storage space may be stored only for a preset time from a time point at which the count value is stored in the storage space as 1, and the count value stored in the storage space may be initialized to the initial value when the preset time elapses (S45). The preset time may be preferably set to 3 seconds as shown in FIG. 2.

A reception number determination step S50 of determining, by the lighting device control apparatus 1000, a number of times by which the input signal has been received based on the count value stored in the storage space may be performed. When the count value stored in the storage space is greater than or equal to a preset value within the preset time, the lighting device control apparatus 1000 may enter a resetting mode. The preset value may be preferably set to 3 as shown in FIG. 2.

When the lighting device control apparatus 1000 enters the resetting mode, the lighting device control apparatus 1000 may enable a BLE stack for performing BLE communication with the user terminal 3000 for a predetermined time (S60). When the BLE stack is enabled (S60), the user terminal 3000 may directly perform the BLE communication with the AP 2000 through the installed app (S70). Thereafter, a resetting information reception step of receiving, by the lighting device control apparatus 1000, resetting information of an AP 2000 that is to be newly connected to the lighting device control apparatus 1000 from the user terminal 3000 through the BLE communication may be performed. In more detail, the resetting information may include a service set identifier (SSID) and a password of the AP 2000 that is to be newly connected to the lighting device control apparatus 1000.

The lighting device control apparatus 1000 that has entered the resetting mode may initialize AP setting information that is previously stored, and perform AP resetting based on the resetting information. Thereafter, an AP connection step of accessing, by the lighting device control apparatus 1000, a WiFi communication network to search for an AP 2000 corresponding to the resetting information, and performing data communication with the AP 2000 may be performed.

Through the steps performed in an AP resetting method for a lighting device control apparatus described above, a resetting operation may be performed on an AP 2000, which is to be newly installed or has setting information that is to be changed, without directly pressing a physical button that is provided in the lighting device control apparatus 1000 to perform the AP resetting. In other words, in a case where resetting of an SSID and a password of the AP 2000 is required for reasons such as a change of an Internet service provider or a change of the password to strengthen security of the AP 2000, the AP resetting operation of the lighting device control apparatus 1000 may be performed more conveniently than a method according to the related art. In addition, a distribution rate of the smart residential lighting device network system may be increased based on such improved convenience.

When the predetermined time elapses after the resetting mode of the lighting device control apparatus 1000 is terminated, the BLE stack may be disabled, and a WiFi stack for performing WiFi communication with the lighting device control apparatus 1000 may be enabled (S80). In more detail, the WiFi stack may be always enabled regardless of an enabling state of the BLE stack, and the step S80 may represent that a WiFi protocol is allowed to use 100% of one physical layer used by the lighting device control apparatus 1000.

After the step S80, the lighting device control apparatus 1000 may receive a constrained application protocol (CoAP) message from the newly connected AP 2000 (S90), and the lighting device control apparatus 1000 may control a plurality of lighting devices connected to the lighting device control apparatus 1000 based on the CoAP message (S100).

Figure 3A:
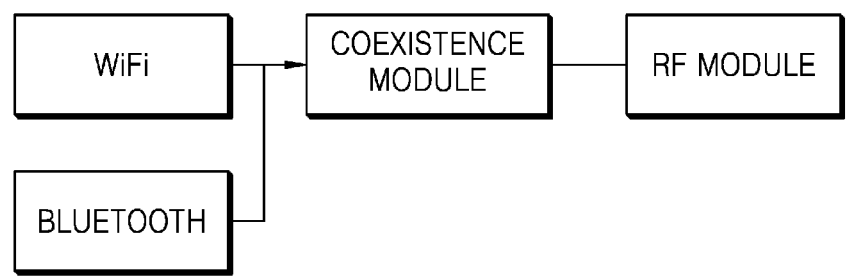
FIGS. 3A and 3B schematically show a time-division communication scheme performed in a lighting device control apparatus according to one embodiment of the present invention.
Figure 3B:
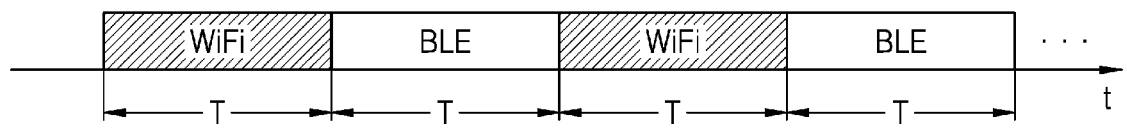

FIGS. 3A and 3B schematically show a time-division communication scheme performed in a lighting device control apparatus 1000 according to one embodiment of the present invention.

As shown in FIGS. 3A and 3B, in the resetting mode, both the WiFi stack and the BLE stack of the lighting device control apparatus 1000 may be enabled, and each of bandwidths of the WiFi communication and the BLE communication may be limited to 50% for one physical layer, so that both the WiFi communication and the BLE communication may be used by the lighting device control apparatus 1000 through a time-division communication scheme; and, when the resetting mode is terminated, the BLE stack of the lighting device control apparatus 1000 may be disabled, and a wireless communication bandwidth of the lighting device control apparatus 1000 may be controlled to allow the WiFi protocol to use 100% of the physical layer.

Schematically, FIG. 3A schematically shows a configuration of a communication module provided inside the lighting device control apparatus 1000, and FIG. 3B schematically shows the time-division communication scheme performed by the lighting device control apparatus 1000 in the resetting mode.

In detail, as shown in FIG. 3A, a coexistence module configured to simultaneously support the WiFi communication and Bluetooth communication (BLE communication) and an RF module may be provided inside the lighting device control apparatus 1000. The coexistence module may perform the WiFi communication when the WiFi stack is enabled, and perform the BLE communication when the BLE stack is enabled. Since the WiFi stack of the lighting device control apparatus 1000 is always enabled, the lighting device control apparatus 1000 may perform the WiFi communication with a bandwidth of 100% in a general situation.

However, when the lighting device control apparatus 1000 enters the resetting mode to enable the BLE stack (S60), as shown in FIG. 3B, the coexistence module may transmit and receive data packets through time-division multiplexing. In other words, as shown in FIG. 3A, when both a WiFi module and a Bluetooth module request an RF resource from the coexistence module, the coexistence module may determine a module to use the RF resource according to a preset rule. The preset rule may be as follows.

The coexistence module may control the WiFi module to use the RF resource for a predetermined time T, and, when the predetermined time T elapses, the coexistence module may control the Bluetooth module to use the RF resource for the predetermined time T. When the predetermined time T elapses, the coexistence module may control the WiFi module again to use the RF resource, and a process described above may be repeatedly performed while the BLE stack is enabled. In other words, the coexistence module may control the one physical layer used by the lighting device control apparatus 1000 to allow each of the WiFi protocol and the BLE protocol to use an identical bandwidth of 50%.

When the BLE stack is enabled, and the resetting mode is terminated after the predetermined time, the BLE stack may be disabled, and the coexistence module may control the WiFi module to use 100% of the RF resource so that the coexistence module may control the WiFi protocol to use 100% of the one physical layer.

As described above, according to one embodiment of the present invention, the BLE communication, which consumes less power as compared with the WiFi communication, may be used in a communication process between the user terminal 3000 and the lighting device control apparatus 1000, so that an energy saving effect may be anticipated.

Figure 4:
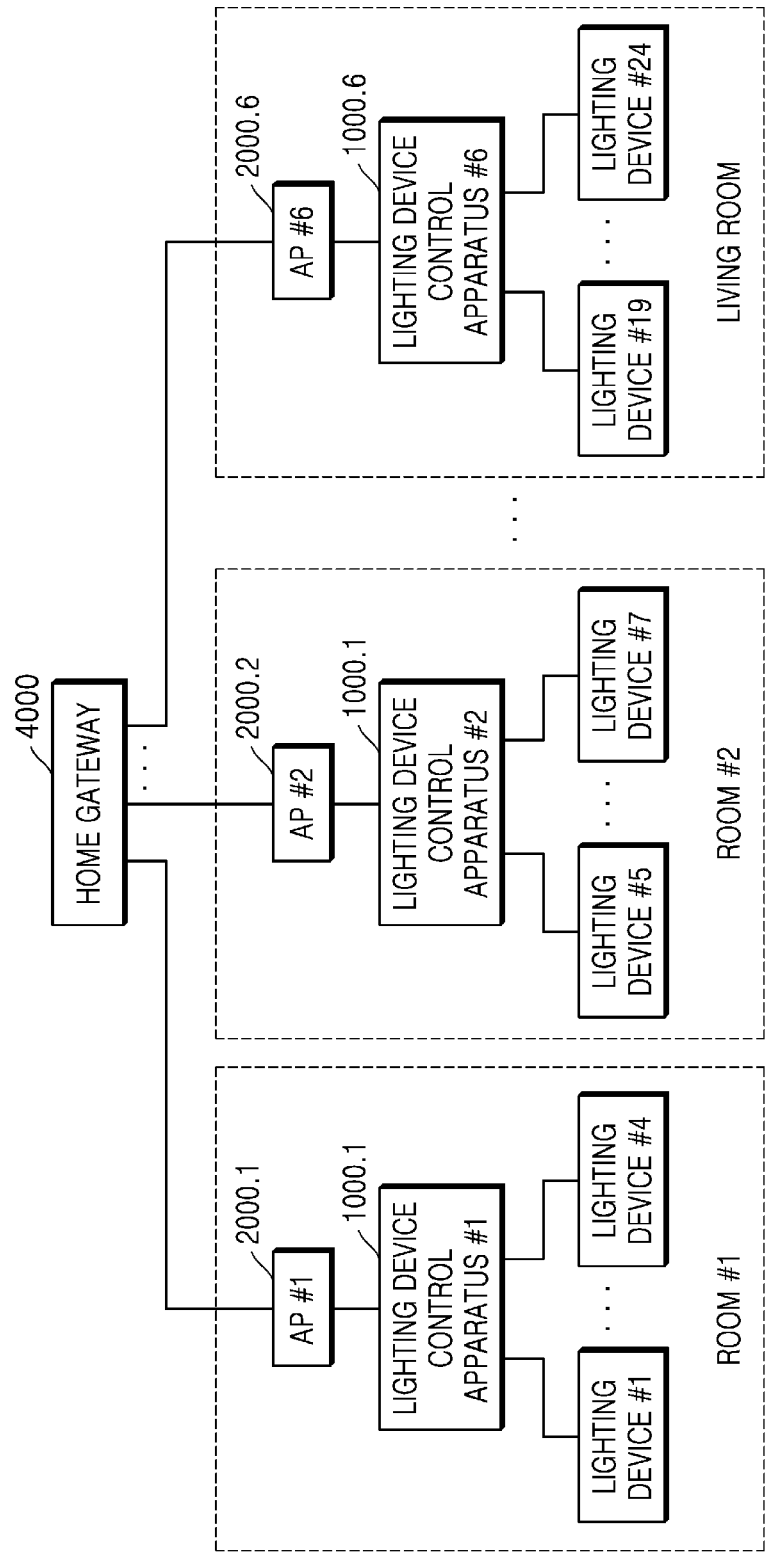
FIG. 4 schematically shows a configuration of a smart residential lighting device network system including a plurality of APs according to one embodiment of the present invention.

FIG. 4 schematically shows a configuration of a smart residential lighting device network system including a plurality of APs 2000 according to one embodiment of the present invention.

Schematically, as described with reference to FIG. 1, FIG. 4 schematically shows an embodiment of a smart residential lighting device network system in which one home gateway 4000 includes a plurality of APs 2000.1 to 2000.6 (hereinafter referred to as "2000") and a plurality of lighting device control apparatuses 1000.1 to 1000.6 (hereinafter referred to as "1000").

In detail, as shown in FIG. 4, the APs 2000 may be provided in a plurality of compartments existing in a residential space, such as a main bedroom, a living room, and a kitchen, respectively. A configuration in which the AP 2000, the lighting device control apparatus 1000, and a plurality of lighting devices are provided in each of the compartments may be the same as the configuration of FIG. 1, and although the wall switch and the lighting device server 5000 are not shown in FIG. 4 for convenience of description, a wall switch and a lighting device server 5000 may be actually connected in the present invention as shown in FIG. 1. Meanwhile, a number of the compartments that are separately provided or a number of the lighting devices in FIG. 4 is only provided as one embodiment for convenience of description, and embodiments are not limited to the configuration shown in FIG. 4.

Hereinafter, a process performed by the home gateway 4000 when a specific AP 2000 performs unstable communication with the home gateway 4000 in the smart residential lighting device network system having the configuration shown in FIG. 4 will be described.

Figure 5:
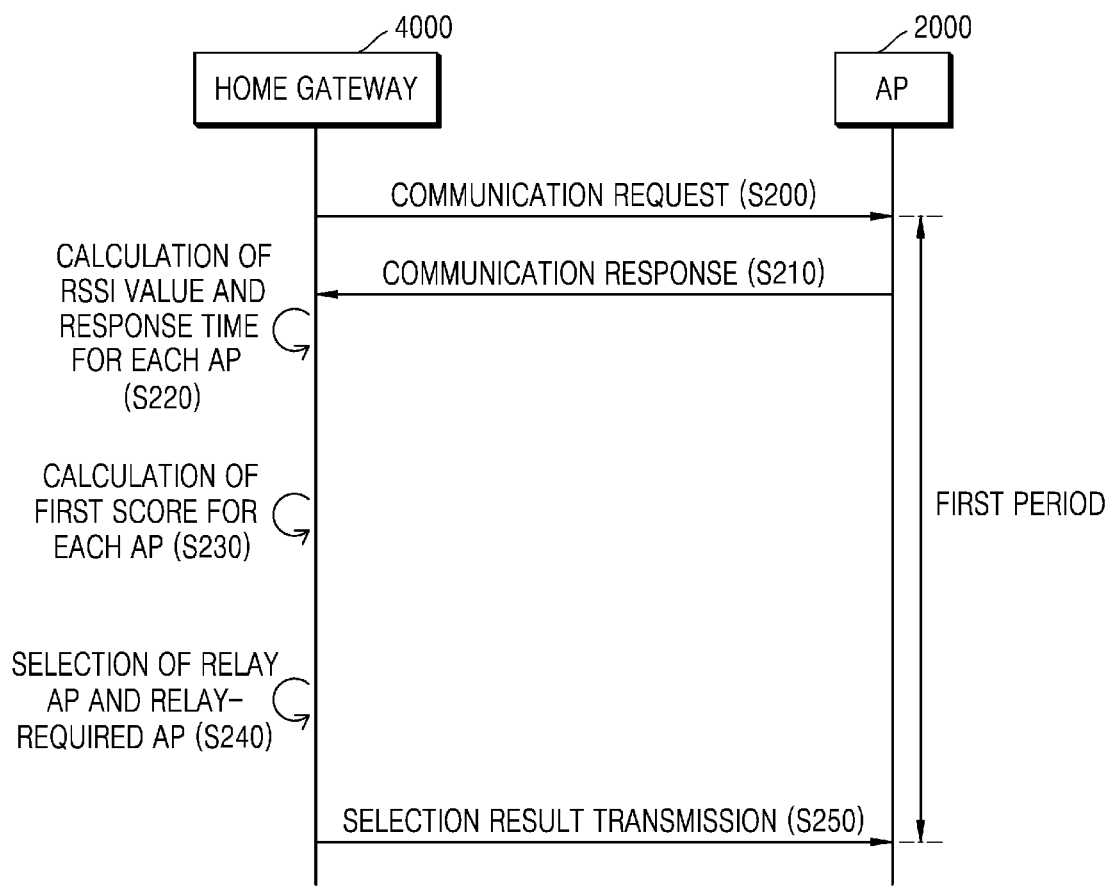
FIG. 5 schematically shows steps performed in a first score calculation step and an AP classification step according to one embodiment of the present invention.
Figure 7:
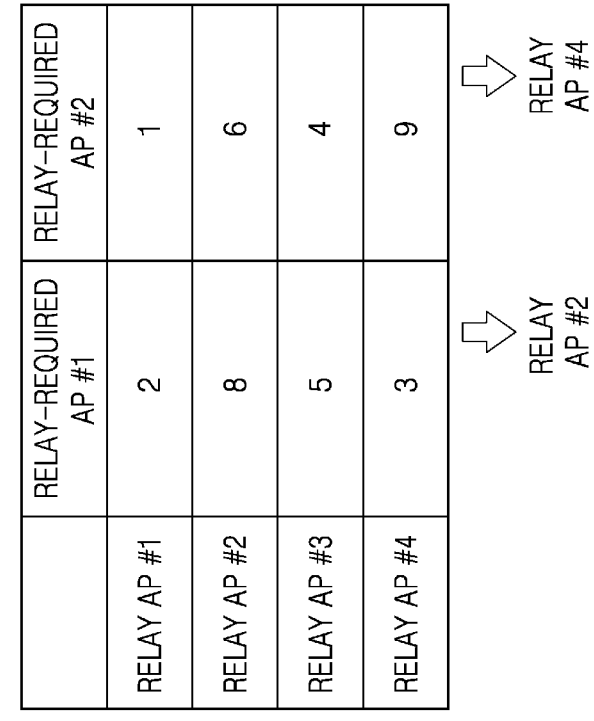
FIGS. 7A and 7B schematically show a process of performing a pairing preparation step according to one embodiment of the present invention.

FIG. 5 schematically shows steps performed in a first score calculation step and an AP classification step according to one embodiment of the present invention, and FIG. 6 schematically shows a process of performing the AP classification step according to one embodiment of the present invention.

As shown in FIGS. 5 and 6, the lighting device server 5000 may transmit the lighting device control signal generated by the user terminal 3000 to a lighting device control apparatus 1000 corresponding to each of a plurality of APs 2000 located in an indoor space through a home gateway 4000 configured to perform communication with the APs 2000, the home gateway 4000 may be configured to perform: a first score calculation step of communicating with each of the APs 2000 in a preset first period to calculate a received signal strength indicator (RSSI) value and a response time for each of the APs 2000, and calculating a first score for each of the APs 2000 for each first period based on the calculated RSSI value and the calculated response time; and an AP classification step of selecting at least one AP 2000 having a first score that exceeds a preset score among the APs 2000 as a relay AP 2100, and selecting at least one AP 2000 having a first score that is less than or equal to the preset score among the APs 2000 as a relay-required AP 2200, and, after the AP classification step, the relay-required AP 2200 may perform a pairing step of performing pairing with a specific relay AP 2100, and the relay-required AP 2200 may receive the lighting device control signal from the relay AP 2100 paired with the relay-required AP 2200 to transmit the lighting device control signal to a lighting device control apparatus 1000 corresponding to the relay-required AP 2200.

In detail, as described above, installation of the home gateway 4000 may be biased to one side due to characteristics of the residential space, or many walls or objects may exist in the residential space, so that the specific AP 2000 may perform the unstable communication with the home gateway 4000. As a result, the lighting device control signal transmitted to the lighting device control apparatus 1000 through the user terminal 3000 and the lighting device server 5000 may not be normally received by the lighting device control apparatus 1000, so that lighting device control desired by the user may not be performed. To prepare for the above problem, the home gateway 4000 may select a relay AP 2100 and a relay-required AP 2200 by using a method that will be described below, and may resolve a communication failure region existing in the residential space.

As shown in FIG. 5, the home gateway 4000 may communicate with all the APs 2000 within the residential space to perform the first score calculation step and the AP classification step. First, the home gateway 4000 may request data communication for checking an access state to each of all the APs 2000 (S200). Each of all the APs 2000 may generate a response signal for responding to the request from the home gateway 4000, and transmit the response signal to the home gateway 4000 (S210).

The home gateway 4000 may analyze the response signal received from each of the APs 2000 to measure the RSSI value and the response time for each of the APs 2000 (S220), and the home gateway 4000 may perform the first score calculation step of calculating the first score obtained by scoring a network access state of the AP 2000 based on the RSSI value and the response time (S230). Thereafter, the home gateway 4000 may select the APs 2000 as the relay AP 2100 and the relay-required AP 2200, respectively, based on a result of performing the first score calculation step and the preset score. When the relay AP 2100 and the relay-required AP 2200 are selected by the home gateway 4000, the home gateway 4000 may transmit a selection result representing that the AP 2000 has been selected as the relay AP 2100 or the relay-required AP 2200 to each of the APs 2000.

According to one embodiment of the present invention, steps to be performed as shown in FIG. 5 may be automatically performed according to the preset first period in order to respond to factors such as a change of a residential environment, a change of a number of APs 2000, and a change of an Internet service provider. Accordingly, the home gateway 4000 may periodically monitor access states of the APs 2000 to select an AP 2000 having an excellent access state as the relay AP 2100, so that the communication failure region may be resolved.

As shown in FIG. 6, the home gateway 4000 may periodically communicate with all the APs 2000 within the residential space to calculate the first score for each of the access states of the APs 2000. All time periods corresponding to T1, T2, and T3 shown on a horizontal axis of a table shown in FIG. 6 may correspond to the first period, and FIG. 6 shows the first score calculated for each of the AP 2000s based on a result of performing the step S220 for a preset period.

The home gateway 4000 may sum up the first score calculated for each first period for each of the APs 2000 during the preset period, and select each of the APs 2000 as the relay AP 2100 or the relay-required AP 2200 based on the preset score. Meanwhile, although not shown in FIG. 6, when the RSSI value calculated in the step S220 is measured to be less than a preset minimum RSSI value, or the response time calculated in the step S220 exceeds a preset maximum response time, the first score of the AP 2000 may be calculated as 0 point. According to one embodiment of the present invention, when the preset score is 60 points as shown in FIG. 6, an AP #1 2000.1 and an AP #6 2000.6 may be selected as a relay AP #1 2100.1 and a relay AP #4 2100.4 by the home gateway 4000, respectively, and an AP #2 2000.2 may be selected as a relay-required AP #1 2200.1 by the home gateway 4000. Even when the AP 2000 has a summed-up score that exceeds 60 points, in a case where 0 point is recorded by a preset number of times or more, the AP 2000 may be selected as the relay-required AP 2200.

Figure 8:
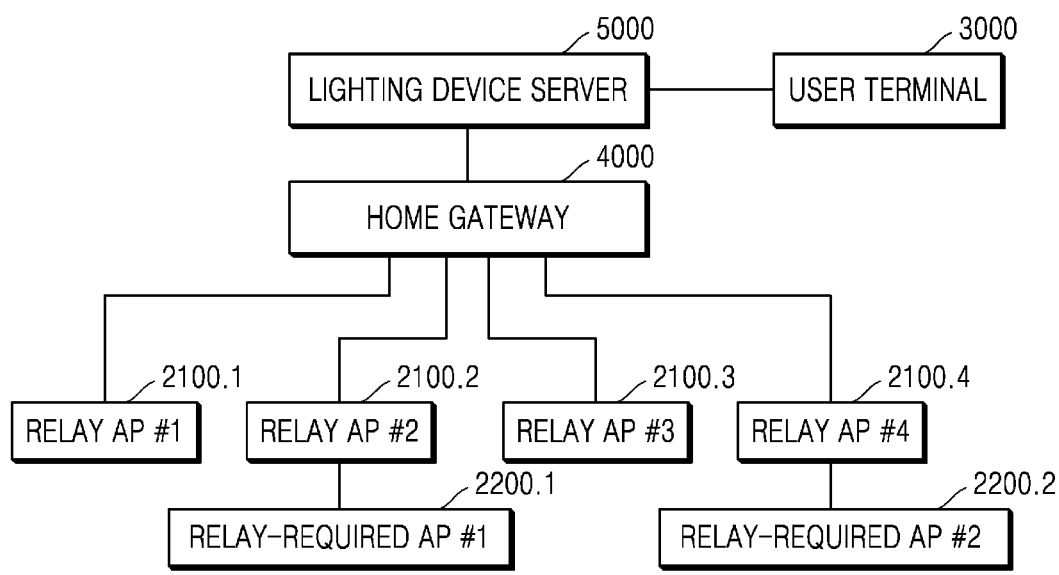
FIG. 8 schematically shows a configuration of a smart residential lighting device network system that has performed a pairing step according to one embodiment of the present invention.

FIGS. 7A and 7B schematically show a process of performing a pairing preparation step according to one embodiment of the present invention, and FIG. 8 schematically shows a configuration of a smart residential lighting device network system that has performed a pairing step according to one embodiment of the present invention.

As shown in FIGS. 7A, 7B and 8, the home gateway 4000 may instruct each of the relay-required AP 2200 and the relay AP 2100 to perform a pairing preparation step in order to perform the pairing step, the pairing preparation step may include: transmitting, by each of one or more relay-required APs 2200, a request signal for checking an access state to each of one or more relay APs 2100; transmitting, by each of the relay APs 2100 that has received the request signal, a response signal for responding to the request signal to each of the one or more relay-required APs 2200; and calculating, by each of the relay-required APs 2200, a second score for each of the relay APs 2100 based on an RSSI value derived during a communication process performed between each of the relay-required APs 2200 and each of the relay APs 2100, and each of the relay-required APs 2200 that has performed the pairing preparation step may perform the pairing step of performing the pairing with a relay AP 2100 having a second score that is calculated to be highest with the relay-required AP 2200.

Schematically, FIG. 7A schematically shows a process in which the at least one AP 2000 selected as the relay-required AP 2200 performs communication with the at least one AP 2000 selected as the required AP 2000, and FIG. 7B shows a table in which a second score is calculated according to a communication result shown in FIG. 7A.

In detail, a process of performing the pairing preparation step shown in FIGS. 7A and 7B may be a process of retrieving, by a relay-required AP 2200, a relay AP 2100 that is to relay a lighting device control signal transmitted to the relay-required AP 2200 to the relay-required AP 2200, and the pairing step may correspond to a step of connecting the relay-required AP 2200 to the relay AP 2100 retrieved in the pairing preparation step.

When the relay AP 2100 and the relay-required AP 2200 are selected by the home gateway 4000, the home gateway 4000 may instruct each of the relay AP 2100 and the relay-required AP 2200 to perform the pairing preparation step. As shown in FIG. 7A, a relay-required AP #1 2200.1 may transmit a request signal for checking an access state to each of relay APs #1 to #4 2100.1 to 2100.4, and each of the relay APs #1 to #4 2100.1 to 2100.4 may transmit a response signal for responding to the request signal to the relay-required AP #1 2200.1. Similarly to the relay-required AP #1 2200.1, a relay-required AP #2 2200.2 may also transmit a request signal for checking an access state to each of the relay APs #1 to #4 2100.1 to 2100.4, and each of the relay APs #1 to #4 2100.1 to 2100.4 may transmit a response signal for responding to the request signal to the relay-required AP #2 2200.2. Each of the relay-required AP #1 2200.1 and the relay-required AP #2 2200.2 may calculate a second score based on an RSSI value derived from a communication process of the request signal and the response signal described above.

FIG. 7B shows a table of the second score calculated in the pairing preparation step according to one embodiment of the present invention. According to the table shown in FIG. 7B, the relay-required AP #1 2200.1 may preferably perform the pairing step of performing the pairing with the relay AP #2 2100.2 having a second score that is calculated to be the highest, and the relay-required AP #2 2200.2 may preferably perform the pairing step of performing the pairing with the relay AP #4 2100.4 having a second score that is calculated to be the highest.

As described above, after the pairing step has been performed, a smart residential lighting device network system that has performed the pairing step may have a configuration as shown in FIG. 8. In a case where the AP #2 2000.2 is the relay-required AP #1 2200.1 as shown in FIGS. 4 and 6, when the user terminal 3000 transmits a lighting device control signal for controlling a lighting device of a room #2 to the lighting device server 5000, the lighting device server 5000 may transmit the lighting device control signal to the relay AP #2 2100.2 through the home gateway 4000, and the relay AP #2 2100.2 may relay the lighting device control signal to the relay-required AP #1 2200.1 to remotely control the lighting device of the room #2 through the user terminal 3000.

Figure 9:
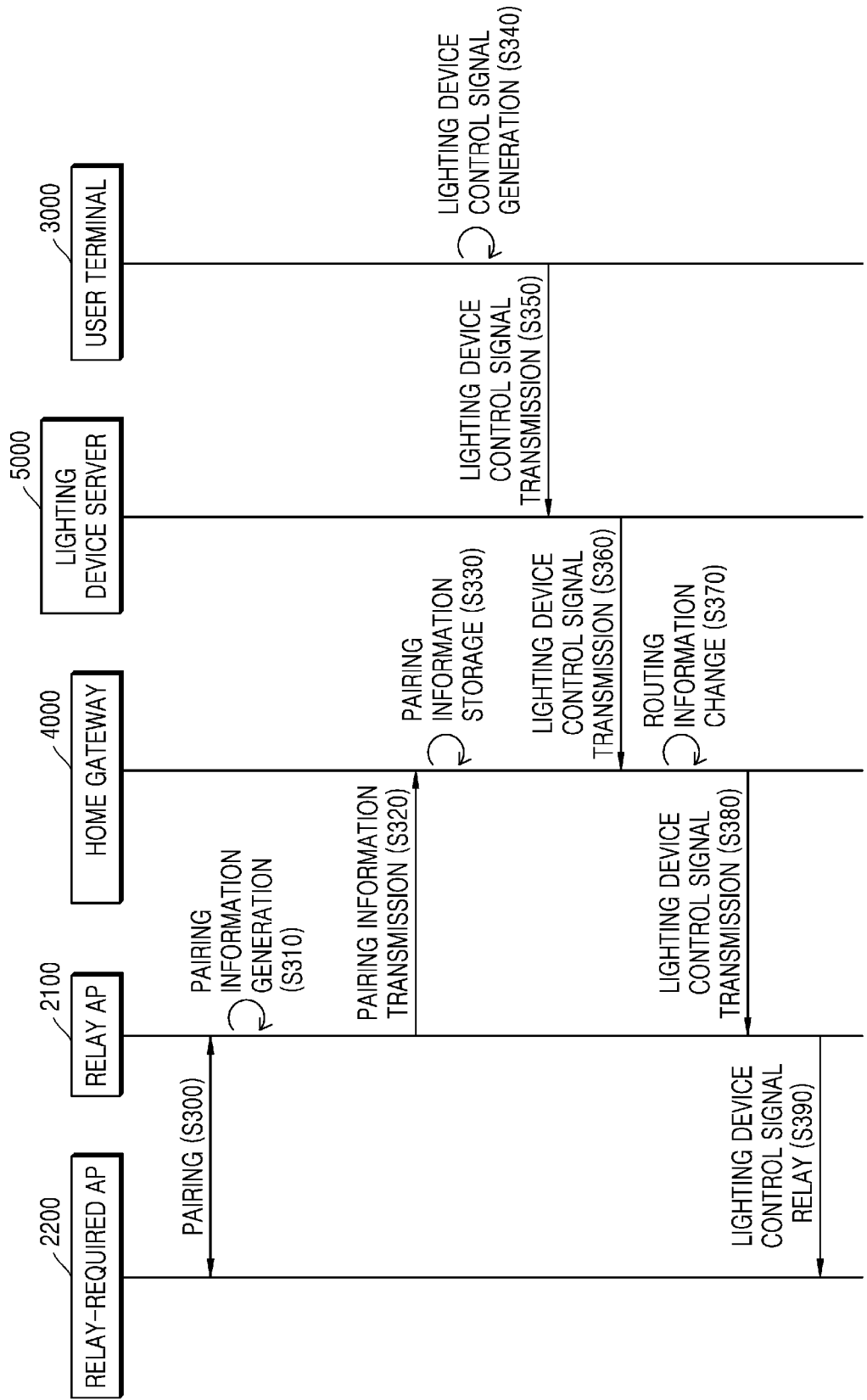
FIG. 9 schematically shows steps performed to relay a lighting device control signal after the pairing step according to one embodiment of the present invention.
Figure 10:
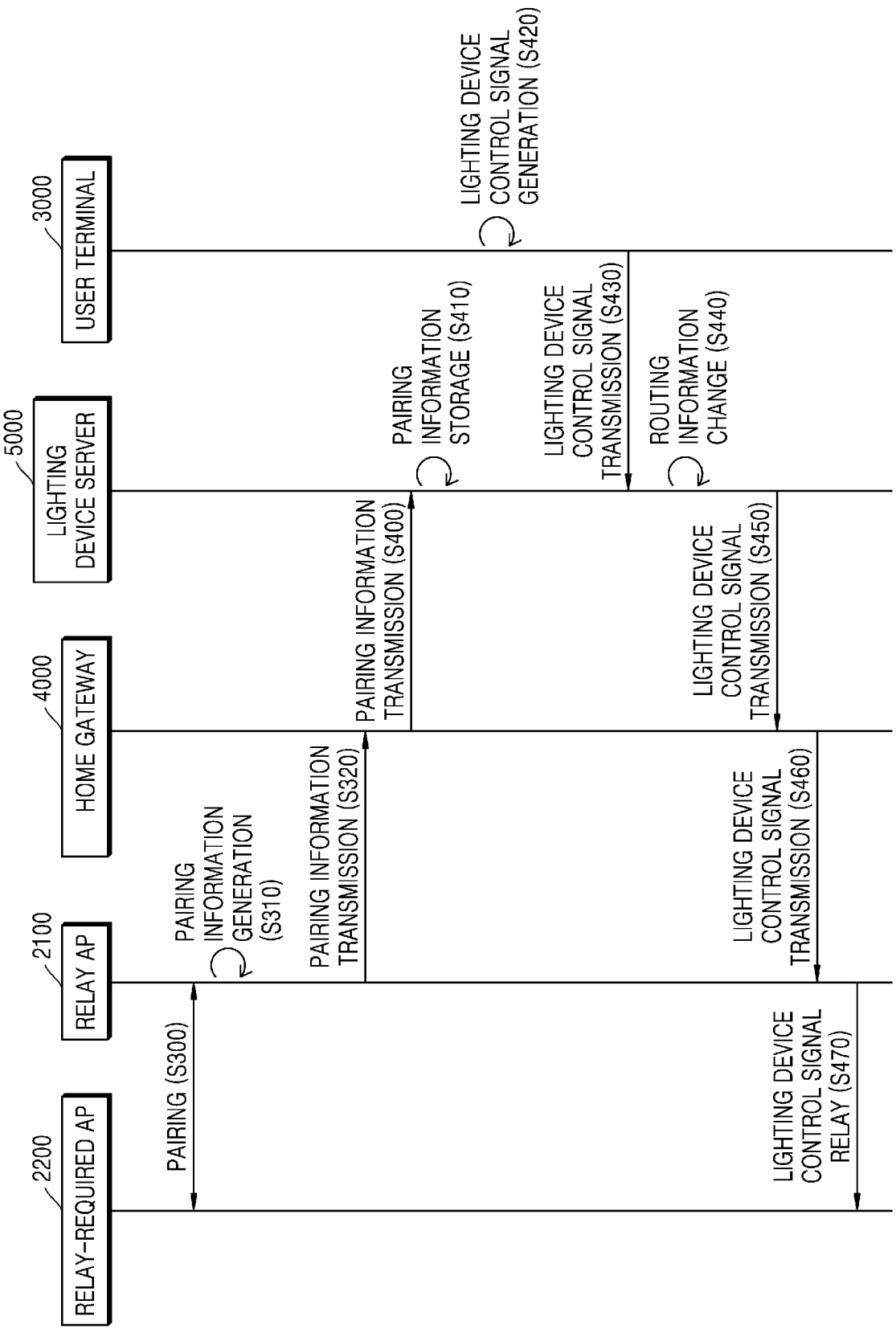
FIG. 10 schematically shows steps performed to relay a lighting device control signal after the pairing step according to another embodiment of the present invention.

FIG. 9 schematically shows steps performed to relay a lighting device control signal after the pairing step according to one embodiment of the present invention, and FIG. 10 schematically shows steps performed to relay a lighting device control signal after the pairing step according to another embodiment of the present invention.

According to one embodiment of the present invention, as shown in FIG. 9, after the pairing step, the home gateway 4000 may perform a first relay information setting step for transmitting the lighting device control signal received from the lighting device server 5000 to the relay-required AP 2200, and the first relay information setting step may include: a first pairing information storage step of receiving pairing information on the relay-required AP 2200 paired with the relay AP 2100 from the relay AP 2100 that has performed the pairing step to store the pairing information in the home gateway 4000; a first lighting device control signal reception step of receiving the lighting device control signal generated by the user terminal 3000 from the lighting device server 5000; a first routing information changing step of changing a receiver of the lighting device control signal to the relay AP 2100 paired with the relay-required AP 2200 when the receiver of the lighting device control signal corresponds to the relay-required AP 2200 stored in the pairing information; and a first lighting device control signal transmission step of transmitting the lighting device control signal, which has routing information that has been changed, to the relay AP 2100.

According to another embodiment of the present invention, as shown in FIG. 10, after the pairing step, the lighting device server 5000 may perform a second relay information setting step for transmitting the lighting device control signal received from the user terminal 3000 to the relay-required AP 2200, and the second relay information setting step may include: a second pairing information storage step of receiving pairing information on the relay-required AP 2200 paired with the relay AP 2100 from the relay AP 2100 that has performed the pairing step to store the pairing information in the lighting device server 5000; a second lighting device control signal reception step of receiving the lighting device control signal generated by the user terminal 3000; a second routing information changing step of changing a receiver of the lighting device control signal to the relay AP 2100 paired with the relay-required AP 2200 when the receiver of the lighting device control signal corresponds to the relay-required AP 2200 stored in the pairing information; and a second lighting device control signal transmission step of transmitting the lighting device control signal, which has routing information that has been changed, to the home gateway 4000.

In detail, the first relay information setting step and the second relay information setting step may correspond to steps for notifying the home gateway 4000 or the lighting device server 5000 that the relay AP 2100 and the relay-required AP 2200 are paired with each other to allow the relay AP 2100 to relay the lighting device control signal to the relay-required AP 2200 when the user terminal 3000 intends to transmit the lighting device control signal to the relay-required AP 2200. In other words, according to one embodiment of the present invention, the routing information of the lighting device control signal may be changed through the first relay information setting step, and according to another embodiment of the present invention, the routing information of the lighting device control signal may be changed through the second relay information setting step.

According to one embodiment of the present invention, the first relay information setting step may be performed as follows. As shown in FIG. 9, when the relay-required AP 2200 and the relay AP 2100 perform the pairing step (S300), the relay AP 2100 may generate the pairing information including information on the relay-required AP 2200 that has performed the pairing step (S310). The relay AP 2100 may transmit the pairing information to the home gateway 4000 (S320), and the home gateway 4000 may store the pairing information (S330).

Thereafter, when the user terminal 3000 generates a lighting device control signal for controlling a lighting device corresponding to the relay-required AP 2200 (S340) to transmit the lighting device control signal to the lighting device server 5000 (S350), the lighting device server 5000 may transmit the lighting device control signal to the home gateway 4000 (S360). The home gateway 4000 that has received the lighting device control signal may check a receiver of the lighting device control signal, and, when the receiver is set as the relay-required AP 2200 stored in the step S330, the home gateway 4000 may change the routing information to allow the lighting device control signal to be transmitted to the relay-required AP 2200 through the relay AP 2100 (S370).

The home gateway 4000 may transmit the lighting device control signal, which has the routing information that has been changed, to the relay AP 2100 (S380), and the relay AP 2100 may relay the lighting device control signal to the relay-required AP 2200 (S390), so that the lighting device may be remotely controlled through the user terminal 3000.

Meanwhile, according to another embodiment of the present invention, the second relay information setting step may be performed as follows. As shown in FIG. 10, when the relay-required AP 2200 and the relay AP 2100 perform the pairing step (S300), the relay AP 2100 may generate the pairing information including information on the relay-required AP 2200 that has performed the pairing step (S310). The relay AP 2100 may transmit the pairing information to the home gateway 4000 (S320), and the home gateway 4000 may transmit the pairing information to the lighting device server 5000 (S400). The lighting device server 5000 that has received the pairing information may store the pairing information in a storage space (S410).

Thereafter, when the user terminal 3000 generates a lighting device control signal for controlling a lighting device corresponding to the relay-required AP 2200 (S420) to transmit the lighting device control signal to the lighting device server 5000 (S430), the lighting device server 5000 that has received the lighting device control signal may check a receiver of the lighting device control signal, and, when the receiver is set as the relay-required AP 2200 stored in the step S410, the lighting device server 5000 may change the routing information to allow the lighting device control signal to be transmitted to the relay-required AP 2200 through the relay AP 2100 (S440).

The lighting device server 5000 may transmit the lighting device control signal, which has the routing information that has been changed, to the home gateway 4000 (S450), the home gateway 4000 may transmit the lighting device control signal to the relay AP 2100 (S460), and the relay AP 2100 may relay the lighting device control signal to the relay-required AP 2200 (S470), so that the lighting device may be remotely controlled through the user terminal 3000.

Figure 11:
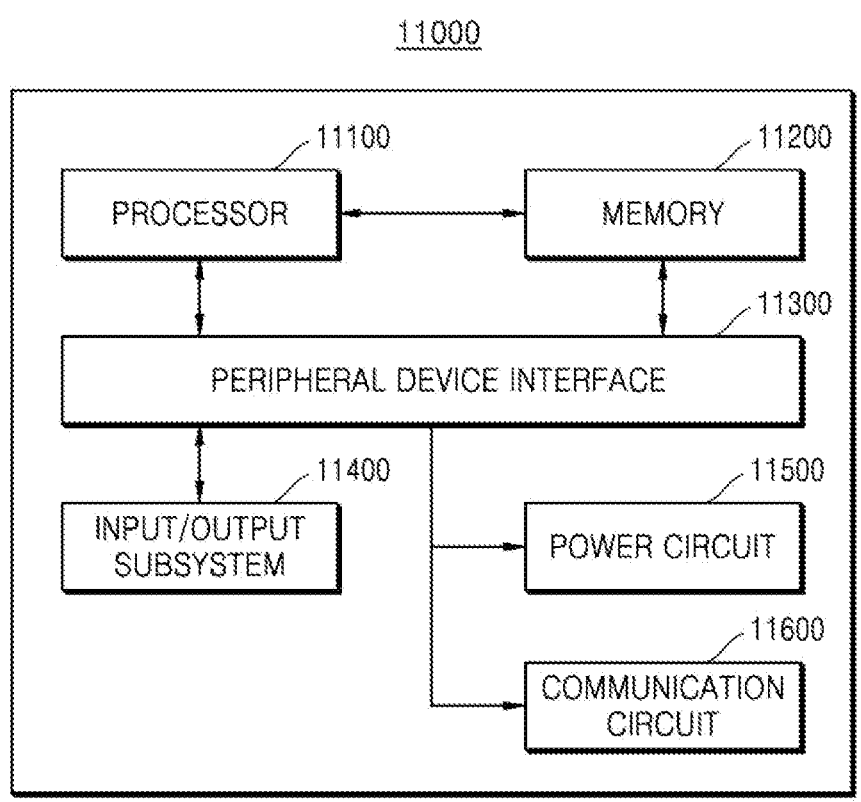
FIG. 11 exemplarily shows an internal configuration of a computing device according to an embodiment of the present invention.

FIG. 11 schematically shows internal components of the computing device according to one embodiment of the present invention.

The lighting device control apparatus 1000, the user terminal 3000, and the lighting device server 5000 shown in the above-described FIG. 1 may include components of the computing device 11000 shown in FIG. 11.

As shown in FIG. 11, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 11 is merely an example of the computing device 11000, and the computing device 11000 may have a configuration or arrangement in which some components shown in FIG. 11 are omitted, additional components not shown in FIG. 11 are further provided, or at least two components are combined. For example, a computing device for a communication terminal in a mobile environment may further include a touch screen, a sensor or the like in addition to the components shown in FIG. 11, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vise versa.

According to one embodiment of the present invention, anyone can safely and conveniently reset an AP setting of a lighting device control apparatus as compared with the related art in which there is a difficulty in resetting a lighting device control apparatus because the lighting device control apparatus is generally installed on a ceiling.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method of resetting a lighting device control apparatus by using a wall switch, the method comprising:
    an input signal transmission step of transmitting, by the wall switch, when a user operates the wall switch connected to a lighting device, an input signal according to the operation to the lighting device control apparatus configured to adjust a brightness and a color temperature of the lighting device;
    a reception number determination step of determining, by the lighting device control apparatus, whether the input signal transmitted from the wall switch has been received by a preset number of times or more within a preset time;
    a resetting information reception step of entering, by the lighting device control apparatus, when the input signal has been received by the preset number of times or more within the preset time, a resetting mode to enable a BLE stack for performing BLE communication with a user terminal for a predetermined time and perform the BLE communication with the user terminal for the predetermined time so as to receive resetting information including a service set identifier (SSID) and a password of a new access point (AP); and
    an AP connection step of initializing, by the lighting device control apparatus, AP setting information that is previously stored, performing AP resetting based on the received resetting information, accessing a WiFi communication network to search for an AP corresponding to the SSID and the password, and performing data communication with the AP,
    wherein, after the AP connection step, the lighting device control apparatus terminates the resetting mode, the user terminal transmits a lighting device control signal for controlling a lighting device corresponding to the lighting device control signal to a lighting device server, and the lighting device server transmits the lighting device control signal to the lighting device control apparatus through the new AP to control the brightness and the color temperature of the lighting device.

2. The method of claim 1, wherein, in the input signal transmission step, the wall switch transmits the input signal to the lighting device control apparatus each time the wall switch is operated from an off-state to an on-state by the user, and, in the reception number determination step, the lighting device control apparatus increases a count value stored in a storage space by 1 each time the input signal is received from the wall switch, automatically initializes the count value to 0 when the preset time elapses, and enters the resetting mode when the count value stored in the storage space reaches a preset value.

3. The method of claim 1, wherein, in the resetting mode, both a WiFi stack and the BLE stack of the lighting device control apparatus are enabled, and each of bandwidths of WiFi communication and the BLE communication is limited to 50% for one physical layer, so that both the WiFi communication and the BLE communication are used by the lighting device control apparatus through a time-division communication scheme, and, when the resetting mode is terminated, the BLE stack of the lighting device control apparatus is disabled, and a wireless communication bandwidth of the lighting device control apparatus is controlled to allow a WiFi protocol to use 100% of the physical layer.

4. The method of claim 1, wherein the lighting device server transmits the lighting device control signal generated by the user terminal to a lighting device control apparatus corresponding to each of a plurality of APs located in an indoor space through a home gateway configured to perform communication with the APs, the home gateway is configured to perform:
 a first score calculation step of communicating with each of the APs in a preset first period to calculate a received signal strength indicator (RSSI) value and a response time for each of the APs, and calculating a first score for each of the APs for each first period based on the calculated RSSI value and the calculated response time; and
 an AP classification step of selecting at least one AP having a first score that exceeds a preset score among the APs as a relay AP, and selecting at least one AP having a first score that is less than or equal to the preset score among the APs as a relay-required AP, and, after the AP classification step, the relay-required AP performs a pairing step of performing pairing with a specific relay AP, and the relay-required AP receives the lighting device control signal from the relay AP paired with the relay-required AP to transmit the lighting device control signal to a lighting device control apparatus corresponding to the relay-required AP.

5. The method of claim 4, wherein the home gateway instructs each of the relay-required AP and the relay AP to perform a pairing preparation step in order to perform the pairing step, the pairing preparation step includes:
 transmitting, by each of one or more relay-required APs, a request signal for checking an access state to each of one or more relay APs;
 transmitting, by each of the relay APs that has received the request signal, a response signal for responding to the request signal to each of the one or more relay-required APs; and
 calculating, by each of the relay-required APs, a second score for each of the relay APs based on an RSSI value derived during a communication process performed between each of the relay-required APs and each of the relay APs, and each of the relay-required APs that has performed the pairing preparation step performs the pairing step of performing the pairing with a relay AP having a second score that is calculated to be highest with the relay-required AP.

6. The method of claim 4, wherein, after the pairing step, the home gateway performs a first relay information setting step for transmitting the lighting device control signal received from the lighting device server to the relay-required AP, and the first relay information setting step includes:
 a first pairing information storage step of receiving pairing information on the relay-required AP paired with the relay AP from the relay AP that has performed the pairing step to store the pairing information in the home gateway;
 a first lighting device control signal reception step of receiving the lighting device control signal generated by the user terminal from the lighting device server;
 a first routing information changing step of changing a receiver of the lighting device control signal to the relay AP paired with the relay-required AP when the receiver of the lighting device control signal corresponds to the relay-required AP stored in the pairing information; and
 a first lighting device control signal transmission step of transmitting the lighting device control signal, which has routing information that has been changed, to the relay AP.

7. The method of claim 4, wherein, after the pairing step, the lighting device server performs a second relay information setting step for transmitting the lighting device control signal received from the user terminal to the relay-required AP, and the second relay information setting step includes:
 a second pairing information storage step of receiving pairing information on the relay-required AP paired with the relay AP from the relay AP that has performed the pairing step to store the pairing information in the lighting device server;
 a second lighting device control signal reception step of receiving the lighting device control signal generated by the user terminal;
 a second routing information changing step of changing a receiver of the lighting device control signal to the relay AP paired with the relay-required AP when the receiver of the lighting device control signal corresponds to the relay-required AP stored in the pairing information; and
 a second lighting device control signal transmission step of transmitting the lighting device control signal, which has routing information that has been changed, to the home gateway.

\* \* \* \* \*